United States Patent Office 2,847,101
Patented Aug. 12, 1958

2,847,101

OVERLOAD RELEASING MAGNETIC POWDER-CLUTCH

Friedrich Bergmann, Ludwigshafen (Rhine), Germany, assignor to Badische Anilin- & Soda-Fabrik Aktiengesellschaft, Ludwigshafen (Rhine), Germany No Drawing. Application November 6, 1952
Serial No. 319,167

Claims priority, application Germany November 10, 1951

4 Claims. (Cl. 192—21.5)

This invention relates to improvements in magnetic powder-couplings.

A coupling is a mechanical device which permits of so connecting a shaft which is not in rotation, with a rotating shaft that the former shaft is driven by means of the transfer of torque from the rotating shaft to it. Among the various kinds of coupling, such as friction couplings and magnetic couplings, the magnetic powder-coupling has recently acquired a certain importance because it is possible therewith to regulate the transferred torque continuously in a simple manner.

The magnetic powder-coupling makes use of the viscosity of a magnetizable iron powder, regulatable by a magnetic field, the coupling being situated in a gap between the driving and driven rotating parts of the coupling. This gap is formed at the same time as a gap in an electromagnet so that by varying the electric current flowing through the electromagnet, the strength of the magnetic field in the gap and therefore of the magnetization of the magnetizable iron powder situated in the gap and consequently its viscosity can be influenced. In this way it is possible to set up any desired degree of coupling between loose and fixed coupling by regulation of the current flowing through the electromagnet.

Whereas with a fixed coupling, i. e. with complete transfer of the torque from the driving shaft to the driven shaft, no slip is formed in the coupling, with a weakly-adjusted coupling, in which only part of the torque is transmitted, such as is advantageous for example when starting up the coupling, there is a slip in the coupling which is converted into heat in the coupling member, which in the case of a magnetic powder-coupling is constituted by the magnetizable powder, and this leads to a heating up of the magnetizable powder.

Similarly, in the case of the fixed coupling, a considerable slip and consequent conversion of driving energy into heat within the magnetizable powder take place when an overload occurs on the driven side. Such an overload, for example in the extreme case by jamming of the driven shaft, can lead to a rapid overheating of the filling of the magnetic powder-coupling and consequent destruction of the activity of the filling, if it is not possible to switch off the drive or the coupling in time.

I have now found that a magnetic powder-coupling which automatically switches off upon the occurrence of overload, is obtained by wholly or partly using as the magnetizable substance a powder of which the magnetization at temperatures which could injure the magnetic powder-coupling, is reduced to such an extent by the choice of a low magnetic Curie point that slip no longer takes place to any considerable extent.

Thus for example an iron-nickel powder may be used as the magnetic powder filling, and a Curie point of about 230° to 400° C. can be obtained by suitable choice of the composition, as for example 56 to 66 percent of iron and 34 to 44 percent of nickel. Ferrite powder, as for example manganese ferrite, lead ferrite or manganese-zinc ferrite, can also be employed with which the Curie point can be adjusted to the desired value of, for example, 200° to 400° C. by suitable choice of the composition, for example in the case of manganese-zinc ferrite by varying the content of zinc oxide. A lead ferrite of the composition $PbFe_2O_4$ has a Curie point of about 340° C. and a manganese ferrite containing 84 percent of $Fe_2O_3$ and 16 percent of MnO has a Curie point of about 260° C. Couplings filled with such magnetizable powders automatically switch off when temperatures which are injurious for the coupling are reached, but regain their original activity at lower temperatures.

Magnetizable powders of the above mentioned kind may according to my invention also be used in coupling devices serving as brakes.

What I claim is:

1. A magnetic coupling for the transmission of torque from one member to another by the application of a magnetic field to a magnetizable powder therebetween, wherein said magnetizable powder consists at least partly of a ferrite powder selected from the group consisting of manganese ferrite, lead ferrite and manganese-zinc ferrite, said powder having a magnetic Curie point between about 200° and 400° C. and below temperatures injurious to said magnetizable powder, whereby the coupling is effective at operating temperatures and automatically disconnects below injurious temperatures when overheated.

2. A coupling as claimed in claim 1 wherein the magnetizable powder consists at least partly of lead ferrite of the composition $PbFe_2O_4$.

3. A coupling as claimed in claim 1 wherein the magnetizable powder consists at least partly of a manganese ferrite containing 84 percent of $Fe_2O_3$ and 16 percent of MnO.

4. A magnetic coupling for the transmission of torque from one member to another by the application of a magnetic field to a magnetizable powder therebetween, wherein said magnetizable powder consists at least partly of a binary to ternary ferrite composed of iron oxide and at least one other metal oxide having a magnetic Curie point of between about 260° and 400° C. and below temperatures injurious to said magnetizable powder, whereby the coupling is effective at operating temperatures and automatically disconnects below injurious temperatures when overheated.

References Cited in the file of this patent

UNITED STATES PATENTS

| | | |
|---|---|---|
| 2,452,530 | Snoek | Oct. 26, 1948 |
| 2,525,571 | Winther | Oct. 10, 1950 |
| 2,736,409 | Logan | Feb. 28, 1956 |

OTHER REFERENCES

Induced Fibration of Suspensions, Journal of Applied Physics, volume 20, December 1949, pages 1137–1140.

Ferro Magnetism, Bozorth, D. Van Nostrand Co., Inc., copyright 1951. (Copy in Division 48.)